(No Model.) 4 Sheets—Sheet 1.

T. J. KOVEN.
CLUTCH.

No. 575,249. Patented Jan. 12, 1897.

WITNESSES:
Paul Jahst
Fred Ackers

INVENTOR
T. J. Koven
BY
[signature]
ATTORNEYS

THE NORRIS PETERS CO., PHOTO-LITHO., WASHINGTON, D. C.

(No Model.) 4 Sheets—Sheet 2.

T. J. KOVEN.
CLUTCH.

No. 575,249. Patented Jan. 12, 1897.

WITNESSES:
Paul Johnst
Fred Allen

INVENTOR
T. J. Koven.
BY
ATTORNEYS (No Model.)  4 Sheets—Sheet 3.
T. J. KOVEN.
CLUTCH.
No. 575,249. Patented Jan. 12, 1897.
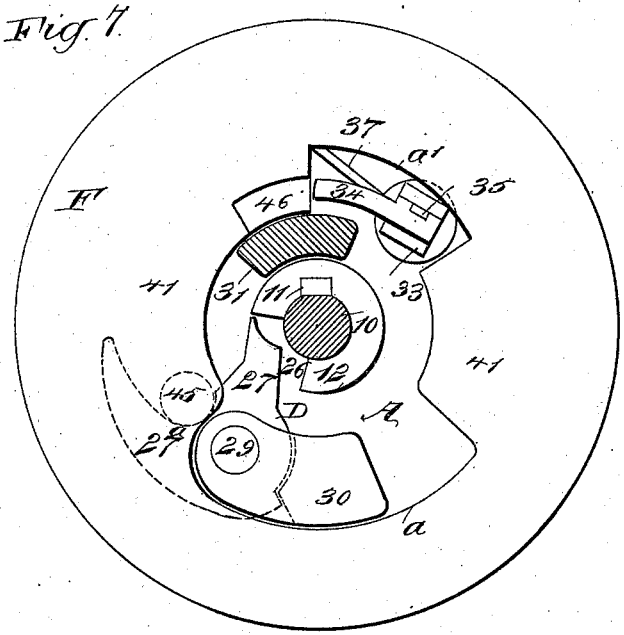
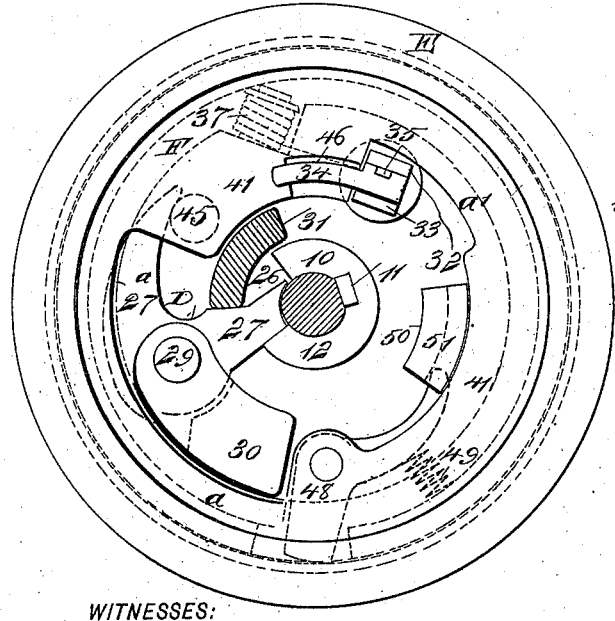
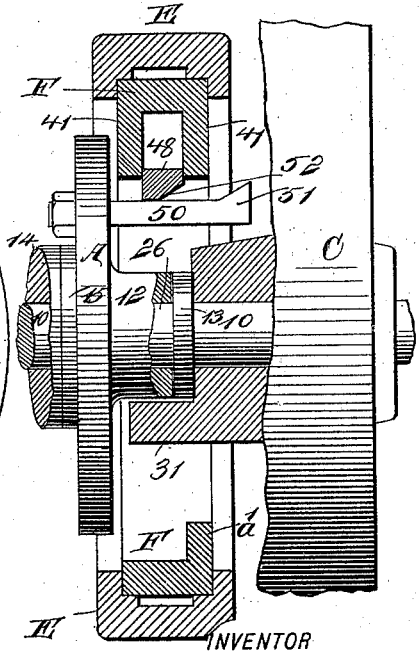
WITNESSES:
INVENTOR
T. J. Koven.
BY
ATTORNEYS (No Model.)   
T. J. KOVEN.  
CLUTCH.
4 Sheets—Sheet 4.
No. 575,249.   Patented Jan. 12, 1897.
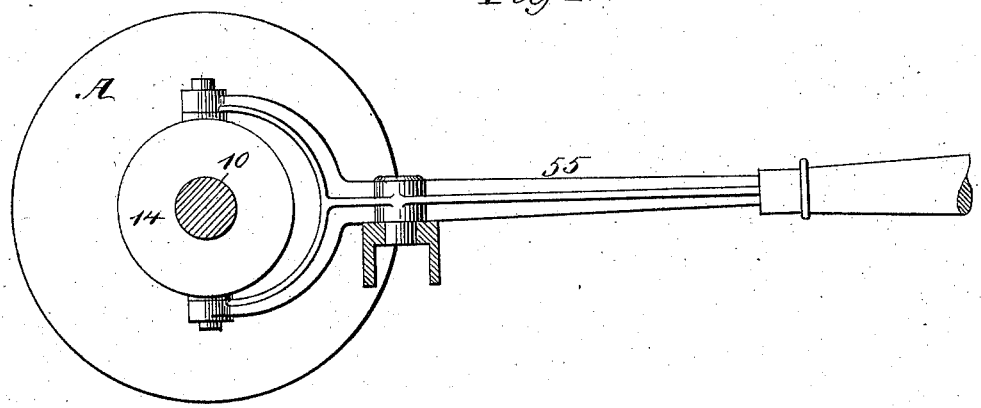
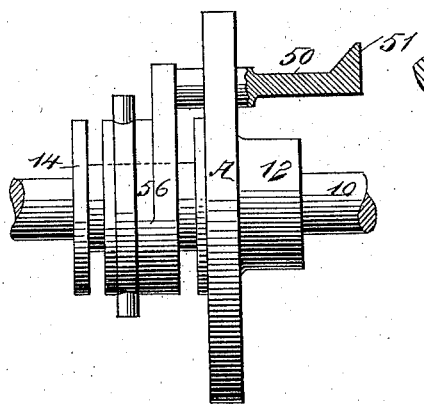 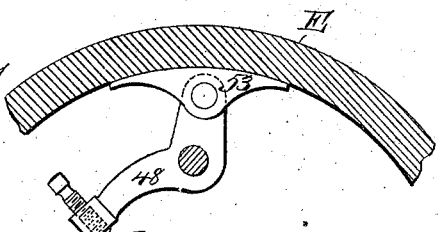
WITNESSES:
INVENTOR  
T. J. Koven  
BY  
ATTORNEYS

UNITED STATES PATENT OFFICE.

THEODORE J. KOVEN, OF JERSEY CITY, NEW JERSEY.

CLUTCH.

SPECIFICATION forming part of Letters Patent No. 575,249, dated January 12, 1897.

Application filed May 13, 1896. Serial No. 591,331. (No model.)

*To all whom it may concern:*

Be it known that I, THEODORE J. KOVEN, of Jersey City, in the county of Hudson and State of New Jersey, have invented a new and Improved Clutch, of which the following is a full, clear, and exact description.

My invention relates to an improvement in clutches for machinery; and it has for its object to so construct a clutch that when used upon a drive-shaft in connection with a driving-pulley and when power is to be applied the shaft will be turned at the outstart but a trifle, the rapidity of the revolution of the shaft being gradually increased from almost an imperceptible motion to that of regular speed.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
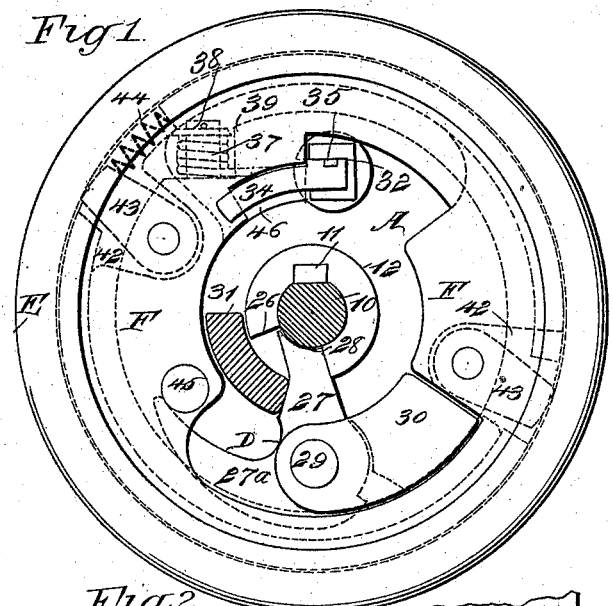
Figure 2:
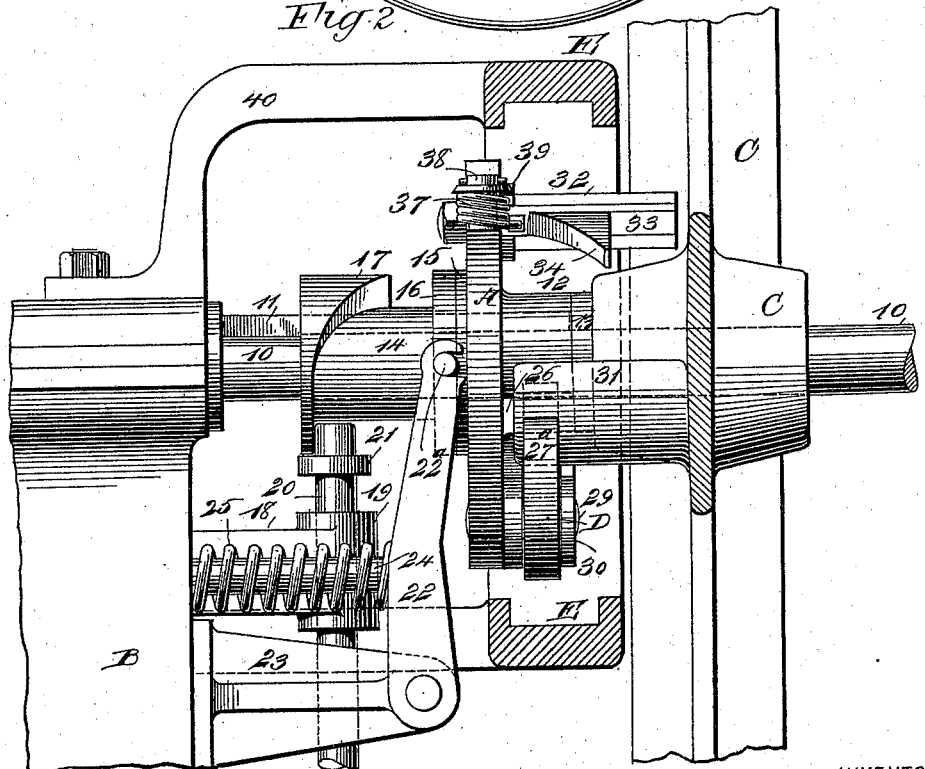
Figure 3:
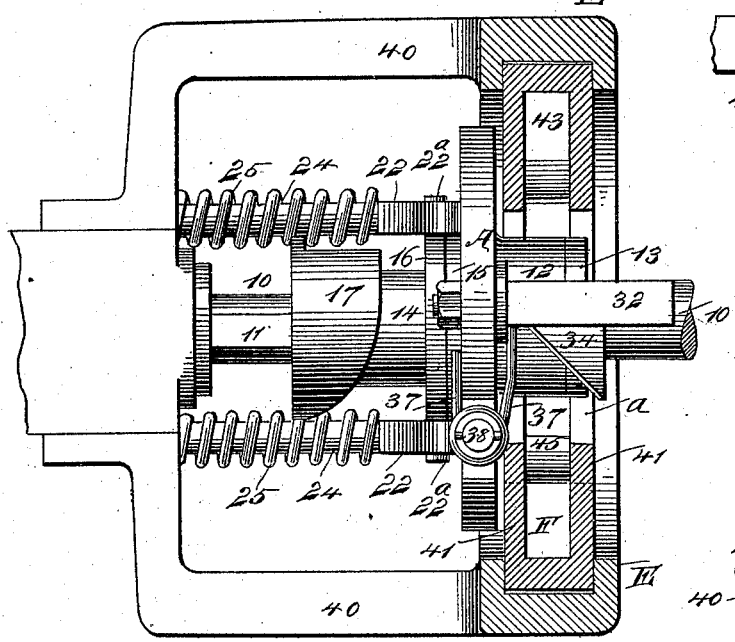
Figure 4:
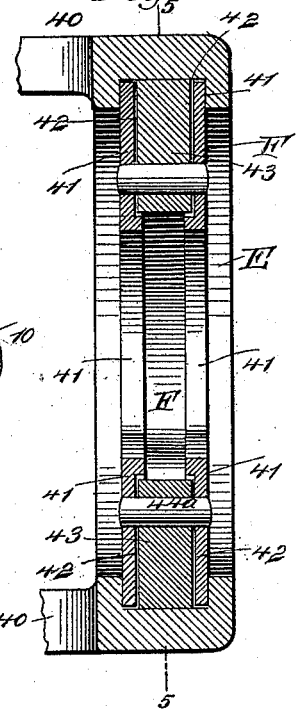
Figure 5:
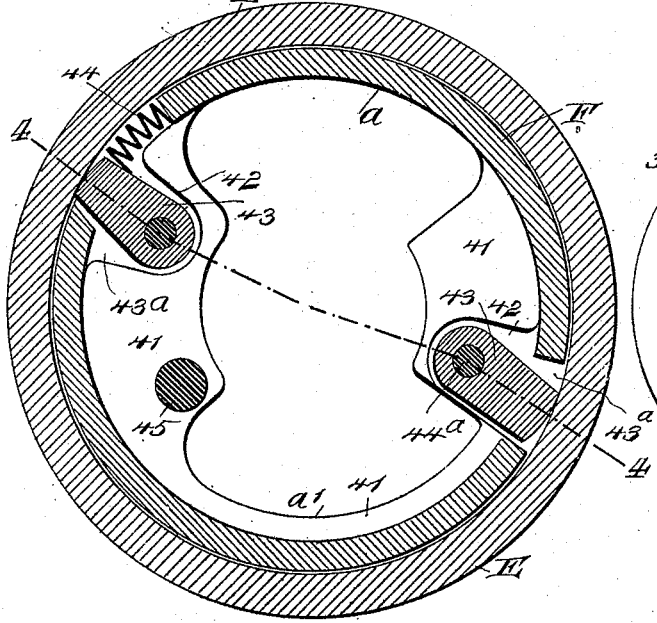
Figure 6:
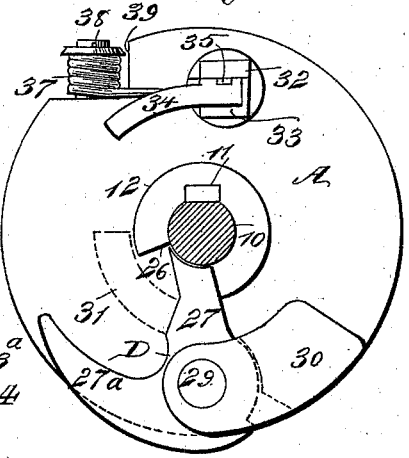

Figure 1 is an outer side elevation of the clutch, the driving-pulley being removed from the driving-shaft, a projection from the hub of the driving-pulley, however, being shown in section and the parts of the clutch in the position they occupy when the driving-shaft is at full speed. Fig. 2 is a side elevation of the clutch, a section through a portion of the driving-pulley, and likewise a section through a portion of the stationary framing of the clutch. Fig. 3 is a plan view of a portion of the clutch and a horizontal section through the stationary frame thereof and the parts operating immediately within it. Fig. 4 is a section through the said stationary frame and the parts operating within it, the said section being taken, essentially, on the line 4 4 of Fig. 5. Fig. 5 is a section taken at right angles to that shown in Fig. 4 and practically on the line 5 5 of said figure. Fig. 6 is an outer face view of the driving-disk of the clutch. Fig. 7 is an outer face view of the clutch, illustrating the position of the parts when the clutch is stationary. Fig. 8 is an outer face view of the clutch, illustrating a slight modification in its construction. Fig. 9 is a diametrical section through the clutch near its center, and Figs. 10, 11, and 12 illustrate modifications in various parts of the clutch.

In carrying out the invention the drive-shaft 10 of the machine is provided with a feather or key 11, produced thereon. A disk A is mounted upon said shaft to turn therewith, yet slide thereon, and the said disk is provided with a hub 12 upon its forward face, adapted to engage with a collar 13, located upon the drive-shaft, which collar separates the driving-pulley C from the said hub 12 of the disk and prevents the driving-pulley from moving toward the disk.

A sleeve 14 is formed upon the inner or opposite face of the disk A, the said sleeve being provided with a collar 15, adjacent to the disk, and a ring 16 is loosely mounted upon the sleeve, adapted for engagement with the said collar, while at the extreme inner end of the sleeve 14 an exterior cam-surface 17 is formed, preferably of a spiral character.

Beneath the drive-shaft 10 a bracket 18 is projected from the framing B of the machine, which bracket carries a socket 19, and in this socket a shaft 20 is mounted to slide, the upper end of which is adapted to engage with the spiral cam-surface 17, its upward movement being limited by a collar 21. This shaft 20 is intended to be provided with a spring which shall exert a constant upward pressure thereon, and the shaft is further intended to be operated by a pedal, whereby it may be drawn downward against the tension of its spring free of its cam 17 and locked in that position. When the shaft 20 is in engagement with the cam 17 and the shaft is revolved, the sleeve 14 will be carried inward upon the shaft, and the disk A will be removed from driving connection with the driving-pulley, and therefore the machine and revolution of the drive-shaft will be stopped, since the driving-pulley is loosely mounted upon said shaft. It is necessary, however, that the moment the shaft 20 is released from the cam 17 the disk A shall again be brought in driving connection with the driving-pulley, and this is usually accomplished in the following manner:

Two arms 22 are located at each side of the sleeve 14, being provided with a hook-shaped or recessed upper end, the upper ends of the arms engaging with pins 22ª upon the loosely-mounted ring 16. The lower ends of the arms 22 are pivotally connected with brackets 23, which are projected outwardly from the frame B of the machine, and rods 24, horizontally located, are attached one to each arm 22, having sliding movement at their opposite ends in suitably prepared and located openings in the frame B, while springs 25 are made to encircle the rods 24, having bearing ordinarily against the frame and against the arms 22, whereby the said springs and arms, through the medium of the loosely-mounted ring 16, will, when the cam 17 is released from the shaft 20, force the disk A outwardly until its hub 12 shall have engaged with the limiting-collar 13 on the drive-shaft.

An angle or elbow lever D is pivoted upon the outer face of the disk A near the periphery of the latter, and the said lever comprises a member 27, which is adapted to extend into a recess 26 in the hub 12 of the disk A, as shown in Figs. 1 and 7, the inner end of this member being rendered concave in order that it may adapt itself to the cylindrical shape of the shaft. The opposite member 27ª of the angle-lever D is substantially hook-shaped, having its inner surface concaved. The pivot-pin 29, which pivots the angle-lever at the junction of its members, is usually passed through a socket formed in a block 30, produced upon the outer face of the shaft, but other means of pivoting may be employed. This lever is brought into action through the medium of a segmental extension 31 from the hub of the driving-pulley, the said extension being carried over the hub 12 of the disk A and moves concentric with the drive-shaft and with said hub; and when this extension of the driving-pulley engages with the inner member of the angle-lever D the said member will be forced to a contact with one of the walls of the hub-slot 26, as shown in Fig. 1, and will place the disk A in driving connection with the driving-pulley.

In the further construction of the disk a block 32 is projected from the outer face of the disk, preferably opposite the pivot 29, and the said block is provided with a slide-way 33 in its under face, adapted to receive a cam 34, having movement in said slideway, being prevented from slipping out therefrom through the medium of a key 35. (Shown in Figs. 5 and 6.) This cam is segmental and extends diametrically across the face of the disk concentric with its hub, the inner edge of the said cam being shaped as an inclined plane, as shown in Fig. 2. This cam is drawn constantly in direction of the disk through the medium of a spring 37, which is usually coiled around a stud 38, located in a recess 39, formed in the periphery of the disk, the spring having a bearing against the inner face of the disk and an attachment to the cam.

A casing E, shaped substantially as a flanged ring, is located around a portion of the outer face of the disk, being placed practically between said disk and the driving-pulley. This casing is ordinarily supported by bracket-arms 40, secured to the frame B of the machine. The casing E is adapted to carry a regulating-ring F, which ring, as shown in Fig. 5, is provided with a flange 41 at both of its sides. This flange is of irregular shape, as is clearly shown in Fig. 5, being entirely omitted at a point $a$ in the regulating-ring and rendered quite narrow at a point $a'$, diametrically opposite to the point $a$. In the wider portion of the flange recesses 42 are produced in the inner face thereof, the recesses being diametrically opposite, and a dog 43 is pivoted between the flanges at their recessed portions, said dogs being provided with cylindrical outer faces which extend from openings 43ª in the regulating-ring to an engagement with the body portion of the ring-casing E, and one or both of said dogs may be controlled by springs 44, (likewise shown in Fig. 5,) the pivot-pins 44ª of the dogs extending through from one flange of the regulating-ring to the other. These dogs permit the regulating-ring to be turned in one direction only, since when the ring is turned in the opposite direction they act as brakes upon the casing and render the ring motionless.

The gradual increase of speed communicated from the clutch to the drive-shaft, the driving-pulley running at all times at a regular speed, is accomplished principally by the action of a pin 45, located in the regulating-ring between the flanges thereof, as shown in Figs. 3 and 5, the said pin being adapted for engagement with and action upon the curved member 27ª of the driving-lever D. The pin when the clutch is first started contacts with the said driving-lever at the junction of its two members, the parts being in the position shown in Fig. 7, whereby when the clutch is driving the shaft to its full speed the pin will be at the free end of the said member 27ª, as shown in Fig. 1. This operation will be hereinafter particularly described.

The sliding cam 34, heretofore referred to, is adapted for binding engagement with the regulating-ring F, a lug 46 being formed upon the outer face of a flange of the said ring, as shown in Fig. 7, to receive the inclined surface of said cam, and these two parts are in binding engagement, as shown in Fig. 1, when the clutch is operating at full speed, whereas they are disengaged when the clutch is silenced.

When the machine is at rest, the inner concaved end 28 of the member 27 of the driving-lever D is tangential to the exterior hub-line of the disk A and the extension 31 of the driving-pulley is coincident with the said hub-surface, as shown in Fig. 7.

Supposing the pin 45 the fixed point on the machine, as appears in Fig. 7, and the disk is released to move toward the driving-pulley, the extension 31 of the pulley will come in contact with the inner member of the driving-lever. The pin 45 being a fixed point on the machine will act as a fulcrum. The disk will move very slowly at first, but will gradually increase in speed until the required speed is obtained. The lever will then have seated itself upon the hub of the disk, as shown in Fig. 1.

The gradual application of power applied from the driving-pulley through the medium of the clutch is accomplished by the extension 31 of the driving-pulley striking the inner member 27 of the driving-lever tangentially and moving it forward by gradually riding upon it, while the opposite member 27$^a$ of the driving-lever will meet with regular yet shifting frictional contact with the pin 45, the power of the contact gradually increasing, owing to the curved formation of this member, and the said member of the driving-lever will thereby receive a graduating impulse from the revolving extension 31 of the driving-pulley and communicate this impulse to the disk, which in turn communicates it to the driving-shaft, until when the outer end of the lever member 27$^a$ reaches the pin 45 the inner lever member 27 will be in full contact with the hub of the disk, and the disk and drive-shaft will turn at the same speed as the driving-pulley.

If the disk A were always in the same position when at rest, the pin 45 would have one fixed position upon the machine, and upon starting the pin and disk would always have the position shown in Fig. 7; but since the disk changes position the pin is placed in the regulating-ring F, held to turn in the casing E, which ring, through the medium of the dogs 43, can turn but in one direction. When the machine is at rest, the ring F holds the pin in correct position to start the machine, and when the machine is started the ring remains stationary until the required speed is reached. This is accomplished by the cam 34 at that time engaging with the lug 46 on the flange of the regulating-ring, and these two parts are so held, binding the disk to the ring, while the clutch is in operation.

When in order to stop the machine the disk is drawn inward, the cam is still kept in engagement with the ring by the spring 37 expanding; but as soon as the driving-lever D is released from the extension of the driving-pulley the regulating-ring may turn, since the tension of the spring 37 will draw the cam inward, and the inclined plane of the cam in leaving the ring-lug 46 will turn said ring sufficiently to bring the pin 45 in position to start the machine, or in the first position. (Shown in Fig. 7.) The adjusting-ring by means of its brakes or dogs also permits the machine to move in one direction only.

When the clutch is uncoupled, it is often necessary for the machine to turn back, in which event the ring F must move backward and the dogs 43 release their grip upon the casing. In this event but one dog 48 may be used, of angular construction, as shown in Fig. 8, embracing a body and a shank, the shank being pressed by a spring 49 to hold the body in contact with the casing. A releasing-bar 50 is secured upon the outer face of the disk A, (see Fig. 9,) terminating at its outer end in an inclined plane 51. The shank of the dog is adapted to ride over this bar, and when back of the inclined plane 51 the spring 49 has a depressing action upon the shank. The shank of the dog, however, has an inclined surface 52 upon the under portion of its outer face. Therefore when the disk is carried back in uncoupling, the inclined surface of the dog-shank will engage with the inclined plane of the releasing-bar and the dog will be disengaged from the casing. When the disk is again coupled, the dog will be in engaging position again, as shown in Fig. 9. It will be understood that two or more such dogs may be used.

In order to prevent the dogs from wearing rapidly and denting the casing E, each of the dogs may be provided with a shoe 53, pivoted thereto, as shown in Fig. 12, and the shank of the dogs may be provided with a set-screw 54 to adjust for wear.

The clutch may be uncoupled by means of a hand or a foot adjusting lever 55, as shown in Fig. 10, and in this event the releasing-bar 50 may be attached to the shifting lever 55, sliding loosely through the disk A, in order that the machine may be started or stopped at any time or turned back.

Having thus described my invention, I claim as new and desire to secure by Letters Patent—

1. In a clutch, the combination, with a driving-shaft and a driving-pulley loosely mounted thereon, the said pulley being provided with an extension from its hub, of a disk mounted to slide upon and turn with the drive-shaft, the said disk being provided with a hub having a recess therein, the extension of the driving-pulley extending over said hub, an angle-lever pivoted upon the disk, one member whereof is adapted to enter the recess in the hub of the disk and is located in the path of the extension from the driving-pulley, the other member of the said lever being curved, a pin adapted as a fulcrum for the lever and for engagement with its curved member, the said pin having substantially a fixed relation to the lever, the latter having movement upon the pin, and a shifting mechanism whereby the clutch may be carried out of the path of the driving-pulley extension, substantially as shown and described.

2. In a clutch, the combination, with a driving-shaft and a driving-pulley loosely mounted thereon and provided with an extension of its hub, of a clutch comprising a disk mounted to slide upon and turn with the driving-shaft, the said disk being provided with a hub over which the extension of the driving-pulley is adapted to extend, the said hub having a recess therein, an angle-lever pivoted upon the disk, one member whereof is adapted for engagement with the extension from the driving-pulley and adapted to enter the recess in the disk-hub, the opposite member having a curved surface, a regulating-ring surrounding the disk, a pin carried by the said regulating-ring, adapted as a fulcrum for the said lever and for engagement with its curved member, a cam connection between the disk and the said ring, and means, substantially as shown and described, for releasing the ring from the disk and simultaneously turning it, as and for the purpose set forth.

3. The combination, with a driving-shaft and a driving-pulley mounted thereon and provided with an extension of its hub, of a clutch comprising a disk mounted to slide upon and turn with the drive-shaft, the said disk being provided with a hub over which the extension of the driving-pulley is adapted to extend, said hub having a recess therein, an angle-lever pivoted upon the disk, one member whereof is adapted for engagement with the extension from the driving-pulley and adapted to enter the recess in the disk-hub, the opposite member having a curved surface, a regulating-ring surrounding the disk, a pin carried by the said regulating-ring, adapted as a fulcrum for the said lever and for engagement with its curved member, a cam connection between the disk and the said ring, means substantially as shown and described, for releasing the ring from the disk and simultaneously turning it, a shifting sleeve connected with the disk, spring-controlled arms pivoted to a fixed support and having outward bearing on the sleeve, a cam carried by the sleeve, and a movable directing-shaft adapted for engagement with the cam, substantially as shown and described.

4. In a clutch, the combination, with a driving-shaft and a driving-pulley mounted thereon and having an extension from its hub, of a clutch comprising a disk mounted to slide upon and turn with the shaft, an angle-lever pivoted upon the disk, one member whereof is adapted to enter a slot in the hub of the disk, the said member being in the path of the extension of the driving-pulley, the opposite end of the lever having a curved face, an adjusting-ring loosely mounted around the disk, a casing in which the said ring has movement, dogs carried by the ring and adapted for engagement with the casing, a spring-controlled locking-cam carried by the disk and adapted for engagement with the said ring, and a pin adapted as a fulcrum for the lever, carried by the ring and engaging with the curved member of the lever, and a shifting mechanism connected with the disk, as and for the purpose set forth.

THEODORE J. KOVEN.

Witnesses:
   JNO. M. RITTER,
   F. W. HANAFORD.